United States Patent Office 3,390,994

Patented July 2, 1968

3,390,994

PHOTODEACTIVATABLE LIGHT-SENSITIVE COLOR-FORMING COMPOSITION

Lawrence Anthony Cescon, Wilmington, Del., assignor to E. I. du Pont de Nemours and Company, Wilmington, Del., a corporation of Delaware No Drawing. Filed Feb. 17, 1966, Ser. No. 534,591
10 Claims. (Cl. 96—48)

ABSTRACT OF THE DISCLOSURE

A composition which forms an intense color when irradiated with light of one wavelength and becomes rapidly insensitive to that light when irradiated with light of a different wavelength. The composition comprises (a) an acid salt of a leuco aminotriarylmethane, (b) a hexaarylbiimidazole, (c) a redox couple of (1) pyrenequinone or phenanthrenequinone and (2) a lower alkyl ester of nitrilotriacetic acid or nitrilotripropionic acid. The composition can be coated from solution on a substrate such as plastic, paper or metal.

This invention is directed to a light-sensitive composition which forms an intense color when irradiated with light of wavelength $W_1$ and becomes rapidly and completely insensitive to this light when irradiated with light of a different wavelength $W_2$. More particularly, the present invention involves a composition consisting essentially of (1) an acid salt of a substituted triarylmethane as color-generator, (2) a hexaarylbiimidazole as photooxidant, (3) a quinone such as a pyrenequinone or phenanthrenequinone as oxidant component of a redox couple and (4) a lower alkyl ester of nitrilotriacetic or nitrilotripropionic acid as reductant component of the redox couple.

When irradiated with a pattern of light of wavelength, $W_1$ the color-generator and the photooxidant undergo a reaction to form an image corresponding to the pattern of light. Light of a second wavelength $W_2$ causes the redox couple to form rapidly a hydroquinone which prevents further color formation by reacting with the photooxidant to produce a colorless product. The composition is thus rapidly and effectively deactivated by light of wavelength $W_2$, and the image appears against a stable background having the color of the untreated substrate. When the composition is irradiated first with a pattern of light of wavelength $W_2$ a latent image is produced by deactivating the composition in the irradiated areas. The latent image is then developed by light of wavelength $W_1$. Thus the invention composition provides either a positive or a negative copy depending upon the order in which the wavelengths of light $W_1$ and $W_2$ are applied. In either case the image is sharp and clear against a stable background.

Image-forming compositions and processes play an essential part in photography, thermography, and related arts dealing with mechanisms of printing and producing images with the aid of light, heat, electricity, or combinations of these activating and deactivating agents. The available methods of image formation impose limitations that are costly, inconvenient, time consuming, and sometimes hazardous. Classical photography, for example, although efficient in the use of light energy, employs expensive chemicals and papers, involves multi-step processing, and requires a skilled operator for good results. Thermography requires less operator skill and less expensive paper but produces images of inferior quality.

It is, therefore, an object of this invention to provide a novel composition for the production of visible images by exposure to light of a given wavelength $W_1$, but capable of being readily and effectively deactivated toward color formation by light of a wavelength $W_2$. Another object is to provide a unique and highly effective reductant as a component of a redox couple in such a light-sensitive composition.

These and other objects of the invention will be apparent from the following description and claims.

More specifically, the present invention is directed to a photosensitive composition which is activated toward color generation by radiation of a given wavelength $W_1$ and being permanently deactivated toward color generation by a second wavelength $W_2$, said composition consisting essentially of (a) An acid salt of an essentially colorless oxidizable substituted aminotriarylmethane, which when contained in the photosensitive composition, is stable to oxidation by atmospheric oxygen under normal room and storage conditions but which is capable of oxidation to a strongly colored species, (b) A hexaarylbiimidazole which, when mixed with the oxidizable aminotriarylmethane and irradiated with light of wavelength of about 2500 A. to 3700 A., will without further activation, oxidize the aminotriarylmethane to a strongly colored species, and, as an essential part of the composition, (c) A redox couple which consists of (1) pyrenequinone or phenanthrenequinone as oxidant and (2) a compound having the general formula $N[(CH_2)_nCOOR]_3$, wherein $n$ is the integer 1 or 2 and R is a straight chain lower alkyl, as reductant, and (d) An inert solvent.

A preferred embodiment is the novel composition heretofore defined wherein the substituted aminotriarylmethane contains at least two p-dialkylamino-substituted phenyl groups having ortho to the methane carbon atom a substituent which is alkyl, alkoxy, or halogen, the hexaarylbiimidazole is a 2,2'-(o-substituted phenyl)-4,4',5,5'-tetraphenylbiimidazole, the oxidant component is a mixture of 1,6- and 1,8-pyrenequinone, and the reductant component is 3,3',3''-nitrilotripropionic acid, trimethyl ester.

This invention also includes embodiments such as a light-sensitive material comprising a supporting base carrying the light-sensitive composition heretofore defined; a plastic film containing the said light-sensitive composition; paper treated with said composition; and the process of producing an image having a light-stable background by irradiating, in a stepwise manner, the composition heretofore defined with light of two different wavelengths between 2500 A. and 5000 A., the first of the wavelengths of light to be applied being in a graphic pattern.

The invention is further directed to a composition consisting essentially of an intimate admixture of (a) an acid salt of the leuco form of a triphenylmethane dye having, in at least two of the phenyl rings positioned para to the methane carbon atom, a $C_1$ to $C_4$ dialkyl amino substituent, (b) a 2,2',4,4',5,5'-hexaarylbiimidazole wherein the aryl groups are alike or different and preferably have an ortho substituent in the 2, and 2'-aryl groups selected from the group consisting of chlorine, bromine, fluorine, lower alkoxy, methyl, and benzo, and (c) a redox couple which consists of (1) a pyrenequinone or phenanthrenequinone as oxidant and (2) a compound having the general formula $N[(CH_2)_nCOOR]_3$, wherein $n$ is the integer 1 or 2 and R is a straight chain lower alkyl as reductant.

This invention makes available a novel composition for forming an image and for preserving it by a dry, rapid, readily controlled procedure. Some of the advantages of this new composition and image-forming process embodiment of this invention over presently available image-forming systems follow.

Unlike photography, the process provided by the present novel composition is uniquely simple and at the same time rapid, and it may be conducted in a single apparatus or machine. In one embodiment, it requires no development step to produce a visible image. It may be dry and, therefore, does not require a wet processing treatment or complicated gadgetry to give the appearance of a dry system. It can produce directly either positive or negative copies.

Unlike xerography, it produces images in a variety of tones, ranging over the entire density scale, and requires no intricate image developing apparatus.

Unlike the thermography of commerce, the image can be deactivated so that it will not be destroyed by further exposure to the activating radiation. It also gives high-resolution images, in a variety of colors with excellent gradation of tone.

Unlike the diazo process, it is a dry process that does not require an objectionable material like ammonia, gives high resolution at greater speed, and produces either negatives or positives from negatives.

(a) COLOR-GENERATOR

The color-generator component of the present invention composition is an acid salt of an essentially colorless aminotriarylmethane bearing substituents on the amino groups and the aryls. Such a compound is a strong acid salt of the leuco form of a triarylmethane dye which compound is oxidized to form color when in the presence of a solvent a mixture of the compound and a hexaarylbiimidazole photooxidant is irradiated. Light of a wavelength from about 2500 A. to about 3700 A. initiates in the irradiated area a redox reaction between the salt of the substituted aminotriarylmethane and the biimidazole. When the light is applied in a pattern a corresponding colored image is formed against a background of unirradiated and, therefore, unchanged material. Because of their superior resistance to color development by air oxidation, the preferred species of aminotriarylmethanes have either an alkyl, alkoxy, or halogen in the ring position ortho to the methane carbon in at least two of the aryl groups. Representative aminotriarylmethanes which are operative according to the present invention include:

bis(2-chloro-4-diethylaminophenyl)(p-chlorophenyl)methane
bis(2-chloro-4-diethylaminophenyl)(p-diethylaminophenyl)methane
bis(2-chloro-4-diethylaminophenyl)phenylmethane
bis(4-diethylamino-2-methoxyphenyl)(4-nitrophenyl)methane
bis(p-diethylaminophenyl)(4-diethylamino-o-tolyl)methane
bis(4-diethylamino-o-tolyl)(4-benzylthiophenyl)methane
bis(4-diethylamino-o-tolyl)[p-(p-chlorobenzylthio)phenyl]methane
bis(4-diethylamino-o-tolyl)(p-chlorophenyl)methane
bis(4-diethylamino-o-tolyl)(p-diethylaminophenyl)methane
bis(4-diethylamino-o-tolyl)(2,3-dimethoxyphenyl)methane
bis(4-diethylamino-o-tolyl)(2,4-dimethoxyphenyl)methane
bis(4-diethylamino-o-tolyl)(3,4-dimethoxyphenyl)methane
bis(4-diethylamino-o-tolyl)(o-fluorophenyl)methane
bis(4-diethylamino-o-tolyl)(p-hydroxyphenyl)methane
bis(4-diethylamino-o-tolyl)(4-isopentylthio-m-tolyl)methane
bis(4-diethylamino-o-tolyl)(4-isopropylthio-m-tolyl)methane
bis(4-diethylamino-o-tolyl)(p-methoxyphenyl)methane
bis(4-diethylamino-o-tolyl)(3,4-methyenedioxyphenyl)methane
bis(4-diethylamino-o-tolyl)(p-nitrophenyl)methane
bis(4-diethylamino-o-tolyl)phenylmethane
bis(4-diethylamino-o-tolyl)-2-thienylmethane
bis(4-dimethylamino-o-tolyl)(o-bromophenyl)methane
bis(4-dimethylamino-o-tolyl)(o-chlorophenyl)methane
(2-chloro-4-diethylaminophenyl)(4-diethylamino-o-tolyl)phenylmethane
(p-diethylaminophenyl)(4-diethylamino-o-tolyl)-o-tolylmethane
tris(p-diethylaminophenyl)methane
tris(4-diethylamino-o-tolyl)methane
tris(2-chloro-5-diethylaminophenyl)methane
tris(4-dimethylamino-o-tolyl)methane With the above compounds which form dyes of the triarylmethane type having substituted amino groups within the dye structure and which are characterized as cationic dyes, an amine salt-forming mineral acid, organic acid, or an acid from a compound supplying acid is employed. The amount of acid for this purpose may vary from one mole to three moles per mole of aminotriarylmethane. The total acid, however, may vary between 1 and 20 moles per mole of leuco dye with a molar ratio of from about 4:1 to 10:1 preferred. A balance of acid between an excess which tends to reduce the reactivity of the light-activated biimidazole and thus renders the composition less light-sensitive and a deficiency which in the presence of the basic ester reductant retards conversion of the leuco form of the dye to the dye must be established by a trial procedure for a composition of given specific components in given amounts. Representative acids which form the required amine salts are hydrochloric, hydrobromic, sulfuric, nitric, phosphoric, acetic, oxalic, and p-toluenesulfonic. Other acids such as those in the "Lewis" sense which may be used in the presence of water or moisture include zinc chloride, zinc bromide, and ferric chloride.

(b) HEXAARYLBIIMIDAZOLES

The hexaarylbiimidazole component of this invention absorbs the activating light when irradiated with light from about 2500 A. to about 3700 A. and dissociates into free radicals. These radicals form the active oxidizing agent which reacts with the acid salt of the aminotriarylmethane by an oxidation-reduction mechanism to product the colored species. Representative hexaarylbiimidazoles suitable for the invention composition are:

2,2′-bis(o-bromophenyl)-4,4′,5,5′-tetraphenylbiimidazole
2,2′-bis(o-chlorophenyl)-4,4′-di-1-naphthyl-5,5′-diphenylbiimidazole
2,2′-bis(o-chlorophenyl)-4,4′,5,5′-tetraphenylbiimidazole
2,2′-bis(o-chlorophenyl)-4,4′,5,5′-tetrakis(p-methoxyphenyl)biimidazole
2,2′-bis(2,4-dichlorophenyl)-4,4′,5,5′-tetraphenylbiimidazole
2,2′-bis(2,3-dimethoxyphenyl)-4,4′,5,5′-tetraphenylbiimidazole
2,2′-bis(2,4-dimethoxyphenyl)-4,4′,5,5′-tetraphenylbiimidazole
2,2′-bis(o-ethoxyphenyl)-4,4′,5,5′-tetraphenylbiimidazole
2,2′-bis(o-fluorophenyl)-4,4′,5,5′-tetraphenylbiimidazole
2,2′-bis(o-methoxyphenyl)-4,4′-bis(p-methoxyphenyl-5,5′-diphenylbiimidazole
2,2′-bis(o-methoxyphenyl)-4,4′,5,5′-tetraphenylbiimidazole
2,2′-bis(o-methoxyphenyl-4,4′,5,5′-tetrakis(p-methoxyphenyl)biimidazole
2,2′-bis(2,4,6-trimethylphenyl)-4,4′,5,5′-tetraphenylbiimidazole
2,2′-di-1-naphthyl-4,4′,5,5′-tetraphenylbiimidazole
2,2′-di-1-naphthyl-4,4′,5,5′-tetrakis(p-methoxyphenyl)biimidazole
2,2′-di-9-phenanthryl-4,4′,5,5′-tetraphenylbiimidazole
2,2′-di-9-phenanthryl-4,4′,5,5′-tetrakis(p-methoxyphenyl)biimidazole
2,2′,4,4′-tetra-1-naphthyl-5,5′-diphenylbiimidazole 2,2',4,4'-tetrakis(o-methoxyphenyl)-5,5'-diphenylbiimidazole
2,2'-di-o-tolyl-4,4',5,5'-tetraphenylbiimidazole
2,2',4,4',5,5'-hexa-1-naphthylbiimidazole
2,2',4,4',5,5'-hexaphenylbiimidazole
2,2',4,4',5,5'-hexa-o-tolylbiimidazole
2,2',4,4',5,5'-hexakis(o-methoxyphenyl)biimidazole The biimidazoles are prepared from the corresponding triarylimidazole as described by Hayashi et al., Bull. Chem. Soc. Japan, 33, #565 (1960).

(c) REDOX COUPLE

A composition which consists only of a hexaarylbiimidazole as photooxidant and a salt of an aminotriarylmethane as color-generator as stated above produces an image when irradiated in a graphic pattern with light of wavelength $W_1$. This image, however, is not permanent because the unirradiated areas of the image will become colored during use if the ambient light contains any light of wavelength $W_1$. A means to deactivate the photosensitive composition, therefore, must be provided, otherwise ambient light will alter or destroy the image. A rapid and complete deactivating means has been found. It consists of including in the photosensitive composition a redox couple consisting of pyrenequinone or 9,10-phenanthrenequinone as oxidant and a $C_1$ to $C_4$ alkyl ester of nitrilotriacetic or 3,3',3''-nitrilotripropionic acid as a reductant. When irradiated with light of wavelength $W_2$ the basic ester so enhances the reduction of the quinone oxidant to a hydroquinone that the hydroquinone is available to deactivate the biimidazole rapidly and completely without color formation. It is a stronger reducing agent than the salt of the aminotriarylmethane color-generator. During storage and until such deactivation is required the basic ester reductant is unreactive and has no adverse effect on any of the components of the light-sensitive composition.

SOLVENTS

Solvents which are inert toward the triphenylmethane color-generator, the hexaarylbiimidazole, and the quinone-nitrilotrialkanoic acid alkyl ester redox couple are usually employed to dissolve these components of the invention composition and thereby mix them together and to provide a fluid medium for application of the light-sensitive composition to substrates. The solvent must also be inert to and must wet but not dissolve the substrate to which the photosensitive materials are applied. A small residue of solvent in the dried composition is needed to produce color and to form an image upon irradiation; a thoroughly dried composition does not respond to light to produce an acceptable image. The light-sensitivity which is lost by complete removal of the solvent is restored, however, by introducing a small amount of solvent as by spraying, brushing, roller coating, and the like.

In general, a suitable solvent has a boiling point of at least 60° C. at atmospheric pressure. Solvents with low vapor pressures and consequent high boiling points may be used and having the advantage of being retained by the composition. Their failure to be readily removed by evaporation will not present a problem, if the quantity used is restricted, as it readily can be in mixtures of solvents with relatively high vapor pressures. Among the solvents which may be employed are acetone, formamide, N,N-dimethylformamide, N,N-dimethylacetamide, hexanamide, stearamide, methanol, ethanol, 1-propanol, 2-propanol, butanol, ethylene glycol, polyethylene glycols, polypropylene glycols, ethyl acetate, ethyl benzoate, benzene, o-dichlorobenzene, toluene, dimethylsulfoxide, pyridine, tetrahydrofuran, dioxane, dicyanocyclobutane, 1-methyl-2-oxohexamethyleneimine, and mixtures of these solvents in various proportions as may be required to attain solution of the particular leuco dye and biimidazole together with the derox couple selected for use in a composition.

A polyaklyleneglycol of relatively low molecular weight is commonly used as a non-volatile solvent in the invention light-sensitive compositions. The alkyl ester of the nitrilotriacetic or nitrilotripropionic acid reductant part of the redox couple also acts as a solvent to provide a medium for reaction between the color forming components and between the deactivating components of the composition. The basicity which this basic ester imparts to the composition when used as a solvent being in excess of that amount needed for its reductant effect toward the quinone tends to decrease the intensity of the color of the image.

BINDERS

In addition to a residual amount of a solvent a binder may be present in the light-sensitive composition spread over a substrate. Binders which may optionally be added to the composition are inert materials that serve to adhere the leuco dye-biimidazole-redox couple mixture to a substrate. The binder may also serve to thicken the solution of the composition should this be desirable for specific applications. Representative binders that will be found applicable are ethyl cellulose, polyvinyl alcohol, polyvinylchloride, polystyrene, polyvinyl acetate, polymethylmethacrylate, cellulose acetate, cellulose acetate butyrate, cellulose nitrate, gelatin. A binder will be used in an amount varying from about 0.5 part to 10 parts by weight per part of combined weight of leuco dye, biimidazole, and redox couple.

The above components of the invention composition, salt of the leuco form of the dye, photooxidant, and oxidant and reductant of the deactivating redox couple, should be used in a high state of purity to avoid interference with the photoimaging (color formation) and photodeactivating reactions by foreign ingredients.

ACTIVATING LIGHT

The wavelength of light $W_1$ is usually between 2500 A. and 3700 A. and $W_2$ between 3800 A. and 5000 A. In general, the light of wavelength $W_2$ is absorbed by the oxidant (quinone) component of the redox couple. Light of wavelength $W_1$ is absorbed by the hexaarylbiimidazole photooxidant. Light of wavelengths $W_1$ and $W_2$ need not be monochromatic. In fact, bands several hundred angstrom units in width are desirable. Suitable bands of light are readily obtained by the use of filters. Cut-off filters, which transmit all light beyond a certain wavelength, and band-pass filters, which transmit only a particular band of light, are useful.

Suitable means for providing light $W_1$ and $W_2$ include appropriate filters and such light sources as sunlamps, electronic flash guns, germicidal lamps, ultraviolet lamps, incandescent lamps, and sunlight.

RATIO OF REACTANTS

The molar ratio of biimidazole photooxidant to aminotriarylmethane color-generator may vary from about 0.1:1 to about 100:1. The preferred range is from 1:1 to 2:1.

The quinone component of the redox couple is measured in proportion to the photooxidant. An operable molar ratio of from 0.01:1 to 2:1 may be employed with a ratio of 0.2:1 to 0.5:1 being preferred. The reductant component (e.g., trimethyl 3,3',3''-nitrilotripropionate) of the redox couple is employed in a molar ratio of from about 1:1 to about 40:1 based on the oxidant component.

SUBSTRATE

The photosensitive compositions of the present invention may be utilized as a coating, impregnant or additive for various substrates. Frequently, the substrates will be materials used in the graphic arts and in decorative applications. The substrates may be rigid or flexible; solid, porous or even liquid; either opaque or transparent to ultraviolet light. They may include paper ranging from tissue paper to heavy cardboard; films of plastics and polymeric materials such as regenerated cellulose, cellulose acetate, cellulose nitrate, polyethylene, polymethyl methacrylate, polyvinyl chloride; textile fabrics; glass; wood and metals. Opaque as well as transparent substrates may be used. Substrates in which the photosensitive composition is dissolved or which bear the composition as a coating on the side away from the light source must be transparent to radiation of wavelengths $W_1$ and $W_2$.

The novel light-sensitive compositions herein described have significant utility in a variety of applications. Among these are:

(1) PRINTING APPLICATIONS

Very soft paper, as for example tissue paper, can be easily imaged when it has been treated with the subject photosensitive composition, by projecting an image onto the treated surface using light of wavelength $W_1$. The imaged paper can then be easily deactivated by light of wavelength $W_2$.

(2) PATTERN LAY-OUT FOR METAL WORKING

The photosensitive composition may be applied to a metal surface when suitably formulated as a paint or a lacquer. The metal surface may then be marked by irradiation with light of one wavelength through a suitable template and the image so produced may be made permanent by irradiation with light of a second wavelength. The image may correspond to holes which are to be drilled or other operations of metal working and manufacture. This technique is particularly valuable when the metal to be marked has an irregular shape.

(3) ENGINEERING DRAWING

When applied to paper, the light compositions of the invention form images in diazo printout equipment, where they can be made to give readily a variety of shades. The image is then deactivated by irradiation with light of a second wavelength. For many of the formulations, this deactivation may be effected by common room light during ordinary useage. In this case, no separate deactivation step is required.

(4) MICROFILM AND MICROFICHE

The compositions of this invention may be formulated into films which can be irradiated and deactivated without being heated or treated with messy chemicals. Because of the excellent resolution, large reductions in size can be made. These microimages provide a convenient and space-saving way of storing vital records.

(5) REFLEX COPYING

Reflex exposure techniques may use the invention composition. By employing reflex exposure, copies can be made from materials having messages on both sides of a page or from opaque supports, e.g., paper, cardboard, metal and the like, as well as from poor light-transmitting surfaces.

Representative examples further illustrating the invention follow.

Example 1

A composition was prepared with the following ingredients:

| | | |
|---|---|---|
| Acetone | g | 46 |
| Polypropylene glycol (mol. wt. about 425) | g | 3 |
| Mixture of 1,6- and 1,8-pyrenequinone (0.13 millimole) | mg | 30.2 |
| Cellulose acetate butyrate | g | 6 |
| 2,2′-bis(o-chlorophenyl)-4,4′,5,5′-tetraphenylbiimidazole (0.26 millimole) | mg | 172 |
| Tris(4 diethylamino-o-tolyl)methane (0.09 millimole) | mg | 45 |
| p-Toluenesulfonic acid monohydrate (1 millimole) | mg | 200 |
| Trimethyl 3,3′,3″-nitrilotripropionate (2.2 millimoles) | mg | 600 |

Bleached sulfite paper was coated with about 3 ml. of the above composition per 1000 sq. cm. and dried in the air. Though a Corning 7–54 filter (supplied by the Corning Glass Company), which transmits light having a wavelength between 2500 A. and 3900 A., and an opaque stencil a portion of the treated paper was irradiated with one flash from a low pressure xenon flash tube having an input of 200 watt-seconds and a light output of 5000 candle power seconds distributed between the wavelentghs of 3500 A. and 6500 A. (supplied by Hico Corporation, Watertown, Mass., under the name of Hico Lite Electronic Flash, Model K). With the stencil and 7–54 filter removed, the paper was then irradiated through a Corning 0–51 filter which transmits light of wavelengths above 3900 A. A clear, sharp image appeared against a stable white background. Subjection of the paper bearing the image to repeated radiation through the 7–54 filter had no apparent effect on the quality of the image or color of the background. Thus, in about 10 milliseconds, the time of a single flash of the flash tube, complete deactivation of the invention light-sensitive composition is effected with light above 3900 A.

When a portion of the above treated paper which had been printed through the stencil and the 7–54 filter was left exposed to ambient fluorescent light in the room for about eight hours, a complete deactivation of the background against coloration by further exposure to ultraviolet light was effected.

Another portion of the paper treated with the foregoing light-sensitive composition was first irradiated through the 0–51 filter and stencil with a single flash of the light and then irradiated only through the 7–54 filter. In this case a stable negative image was produced; that is, the stencil letters appeared colorless against a deeply colored blue background.

In the above composition triethyl nitrilotriacetate was substituted for trimethyl nitrilotripropionate with comparable results.

Example 2

In the composition of Example 1 the color-generator tris(4-diethylamino-o-tolyl)methane was replaced by bis(4-diethylamino-o-tolyl)(3,4 - dimethoxyphenyl)methane and the p-toluenesulfonic acid monohydrate was reduced to 180 mg. Paper treated with this composition and irradiated first through filter 7–54 and a stencil and then through filter 0–51 as described in Example 1 produced a sharp gray colored image against a stable background.

Example 3

In the composition of Example 1 27.0 mg. (0.13 millimole) of 9,10-phenanthrenequinone was substituted for the 1,6- and 1,8-pyrenequinone. When this composition was coated on paper and irradiated as described in Example 1, clear positive and negative images were obtained against stable backgrounds.

Example 4

The following composition was prepared:

| | | |
|---|---|---|
| Acetone | g | 46 |
| Polypropylene glycol (mol. wt. about 425) | g | 3 |
| Mixture of 1,6- and 1,8-pyrenequinone (0.13 millimole) | mg | 30.2 |
| Cellulose acetate butyrate | g | 6 |
| 2,2′-bis(o-chlorophenyl)-4,4′,5,5′-tetraphenylbiimidazole (0.2 millimole) | mg | 132 |
| Bis(4-diethylamino-o-tolyl)(p-benzylthiophenyl)methane (0.23 millimole) | mg | 120 |
| p-Toluenesulfonic acid monohydrate (0.65 millimole) | mg | 130 |
| Trimethyl 3,3′,3″-nitrilotripropionate (2.2 millimoles) | mg | 600 |

This composition was coated on paper and irradiated as described in Example 1 to produce a clear sharp positive light gray image against a white background.

Example 5

The composition of Example 1 was coated on polyester film and irradiated through the 7–54 filter and a stencil as already described. Then the film bearing the image was irradiated through the 0–51 filter to deactivate the composition. There appeared a sharp blue image on a transparent background free from color, which background remained colorless upon subsequent exposure to the short wavelength light of the flash tube.

Example 6

A composition was prepared with the following ingredients:

| | | |
|---|---|---|
| Acetone | g | 23 |
| 2,2'-bis(o-chlorophenyl)-4,4',5,5'-tetraphenylbiimidazole (0.13 millimole) | mg | 86 |
| Tris(4 diethylamino-o-tolyl)methane (0.045 millimole) | mg | 22.5 |
| p-Toluenesulfonic acid monohydrate (0.5 millimole) | mg | 100 |
| Trimethyl 3,3',3''-nitrilotripropionate (1.1 millimole) | mg | 300 |
| Mixture of 1,6- and 1,8-pyrenequinone (0.08 millimole) | mg | 18.6 |

Bleached sulfite paper was coated with the above composition as described in Example 1. The paper was then dried under an infrared lamp until dry to feel and no odor of acetone could be detected. Upon irradiation with a single flash of light through a Corning 7–54 filter and stencil as described in Example 1, a blue image appeared. The trimethylester of nitrilotripropionic acid acted as a solvent medium for the image forming reaction. Another portion of the treated infrared lamp-dried paper was briefly heated on a hot plate and then irradiated as before. Only a weak, dimly visible image formed. The trimethyl ester contained in the composition was almost completely removed either by evaporation or decomposition. When the paper was swabbed with acetone and again irradiated, a sharp, clear image appeared. Thus, it is seen that (1) the trimethyl ester acts as a solvent, (2) a composition relatively free from solvent fails to respond to image formation, and (3) light-sensitivity is restored by introducing a solvent.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property of privilege is claimed are as follows:

1. A composition consisting essentially of
   (a) an acid salt of an essentially colorless oxidizable substituted aminotriarylmethane which, when contained in said composition, is stable to oxidation by atmospheric oxygen under normal room and storage conditions but which is capable of oxidation to a strongly colored species, and wherein the acid portion of the aminotriarylmethane acid salt is derived from a mineral acid, an organic acid or acid-supplying compound,
   (b) a hexaarylbiimidazole which, when mixed with the oxidizable aminotriarylmethane acid salt and irradiated with light of wavelength of about 2500 A. to 3700 A., will, without further activation, oxidize said aminotriarylmethane acid salt to a strongly colored species,
   (c) a redox couple consisting of (1) an oxidant component selected from pyrenequinone or phenanthrenequinone and (2) a reductant component consisting of a compound having the general formula $N[(CH_2)_nCOOR]_3$, wherein $n$ is the integer 1 or 2 and R is straight chain lower alkyl.

2. A composition consisting essentially of (a) an acid salt of the leuco form of a triphenylmethane dye having, in at least two of the phenyl rings positioned para to the methane carbon atom, a $C_1$ to $C_4$ dialkyl amino substituent, and having the acid portion derived from a mineral acid, an organic acid or an acid-supplying compound, (b) a 2,2',4,4',5,5'-hexaarylbiimidazole wherein the aryl groups are alike or different and preferably have an ortho substituent in the 2, and 2'-aryl groups selected from the group consisting of chlorine, bromine, fluorine, lower alkoxy, methyl, and benzo, and (c) a redox couple which consists of (1) pyrenequinone or phenanthrenequinone as oxidant and (2) a compound having the general formula $N[(CH_2)_nCOOR]_3$, wherein $n$ is the integer 1 or 2 and R is a straight chain lower alkyl, as reductant.

3. A composition according to claim 1 wherein the substituted aminotriarylmethane contains at least two p-dialkylamino-substituted phenyl groups having, ortho to the methane carbon atom, a substituent selected from the group consisting of alkyl, alkoxy and halogen, the hexaarylbiimidazole is a 2,2'-(o-substituted phenyl)-4,4',5,5'-tetraphenylbiimidazole, the oxidant component is a mixture of 1,6- and 1,8-pyrenequinone, and the reductant component is 3,3',3''-nitrilotripropionic acid, trimethyl ester.

4. The composition of claim 1 wherein the oxidant of the redox couple is a mixture of 1,6-pyrenequinone and 1,8-pyrenequinone, and the reductant of the redox couple is the trimethyl ester of 3,3',3''-nitrilotripropionic acid.

5. The composition of claim 1 wherein the oxidant of the redox couple is a mixture of 1,6-pyrenequinone and 1,8-pyrenequinone, and the reductant of the redox couple is the trimethyl ester of 3,3',3''-nitrilotriacetic acid.

6. A coating composition comprising (a) the composition of claim 1 and (b) an inert solvent.

7. A light-sensitive material consisting essentially of a supporting base carrying a composition according to claim 1.

8. A light-sensitive material consisting essentially of a plastic film containing a composition according to claim 1.

9. Paper treated with a composition according to claim 1.

10. The process of producing an image having a light-stable background by irradiating a composition according to claim 1, said irradiation being effected, in any order, with light of two different wavelengths, one between 2500 A. and 3700 A., and the other between 3700 A. and 5000 A., the first of said wave lengths of light to be applied in a graphic pattern.

References Cited

UNITED STATES PATENTS 3,284,205 11/1966 Sprague et al. ---- 96—90
3,285,744 11/1966 Sprague et al. ---- 96—90

FOREIGN PATENTS 917,919 2/1963 Great Britain.

OTHER REFERENCES

Hayashi et al.: Bull. Chem. Soc. Japan, 33, #565 (1960).

NORMAN G. TORCHIN, *Primary Examiner.*

C. E. DAVIS, *Assistant Examiner.*